(12) United States Patent
Alessio et al.

(10) Patent No.: US 8,265,282 B2
(45) Date of Patent: Sep. 11, 2012

(54) METHOD OF AND SYSTEM FOR SECURE MANAGEMENT OF DATA STORED ON ELECTRONIC TAGS

(75) Inventors: Elisa Alessio, Turin (IT); Fabio Ricciato, Turin (IT); Maura Santina Turolla, Turin (IT)

(73) Assignee: Telecom Italia S.p.A., Milan (IT)

( * ) Notice: Subject to any disclaimer, the term of this patent is extended or adjusted under 35 U.S.C. 154(b) by 1004 days.

(21) Appl. No.: 11/659,946

(22) PCT Filed: Aug. 13, 2004

(86) PCT No.: PCT/EP2004/009130
§ 371 (c)(1),
(2), (4) Date: Feb. 12, 2007

(87) PCT Pub. No.: WO2006/015617
PCT Pub. Date: Feb. 16, 2006

(65) Prior Publication Data
US 2008/0175390 A1 Jul. 24, 2008

(51) Int. Cl.
*H04L 29/06* (2006.01)
(52) U.S. Cl. ........................... 380/278; 380/270
(58) Field of Classification Search ............... 380/278, 380/270; 340/10.1
See application file for complete search history.

(56) References Cited

U.S. PATENT DOCUMENTS

| | | | |
|---|---|---|---|
| 5,469,363 A | 11/1995 | Saliga | |
| 5,473,690 A | 12/1995 | Grimonprez et al. | |
| 6,385,723 B1 * | 5/2002 | Richards | 713/160 |
| 6,463,534 B1 * | 10/2002 | Geiger et al. | 713/168 |
| 6,480,100 B1 | 11/2002 | Frieden et al. | |
| 7,268,667 B2 * | 9/2007 | Beenau et al. | 340/10.1 |
| 2003/0006878 A1 | 1/2003 | Chung | |
| 2003/0174839 A1 | 9/2003 | Yamagata et al. | |
| 2005/0105734 A1 * | 5/2005 | Buer et al. | 380/270 |
| 2009/0315670 A1 * | 12/2009 | Naressi et al. | 340/5.8 |

FOREIGN PATENT DOCUMENTS

| | | |
|---|---|---|
| EP | 0 798 673 | 10/1997 |
| EP | 0 973 136 | 1/2000 |
| EP | 1 079 338 | 2/2001 |
| WO | WO 97/22092 | 6/1997 |
| WO | WO 99/05659 | 2/1999 |
| WO | WO 00/26866 | 5/2000 |
| WO | WO 2004/089017 | 10/2004 |
| WO | WO 2005081088 A1 * | 9/2005 |

* cited by examiner

*Primary Examiner* — Jeffrey D Popham
*Assistant Examiner* — Tracy Mangialaschi
(74) *Attorney, Agent, or Firm* — Finnegan, Henderson, Farabow, Garrett & Dunner, L.L.P.

(57) ABSTRACT

A method of secure management of data records stored in an RFID (Radio Frequency Identification) tag includes data fields whose contents are provided by different parties. Some of the data-fields contain public information data accessible to authorized end users. The data records are stored in encrypted form by encrypting data provided by different parties with different keys so as to set different access rights for contents providers and end users. The end users are supplied only with the keys allowing access to information data fields, whereas proprietary data are accessible only to the data owners. The keys are provided to the users in encrypted form.

23 Claims, 4 Drawing Sheets

METHOD OF AND SYSTEM FOR SECURE MANAGEMENT OF DATA STORED ON ELECTRONIC TAGS

CROSS REFERENCE TO RELATED APPLICATION

This application is a national phase application based on PCT/EP2004/009130, filed Aug. 13, 2004, the content of which is incorporated herein by reference.

FIELD OF THE INVENTION

The present invention refers to Radio Frequency IDentification (RFID) systems, and more particularly it concerns a method of and a system for secure management of data stored on electronic tags, as well as an electronic tag storing data managed by the method and the system.

Preferably, but not exclusively, the invention is applied in RFID-based information services implemented within a wireless scenario.

BACKGROUND OF THE INVENTION

RFID technique is based on reading information stored in electronic form on a so-called electronic tag (in short, e-tag) and is used for a number of applications requiring object tracking, such as logistics, stock management and inventories, road toll payment, and so on.

At present, use of this technique is being proposed also for a variety of information services, such as provision of tourist information, commercial information and the like: here, the tags should store a short description of monument located in their vicinity or to which they are affixed, or lists of restaurants, shops, museums in a certain town area, etc.

An important issue when using electronic tags is the integrity and the security of the data stored on the tags.

U.S. Pat. No. 6,480,100 describes a method of formatting an electronic tag, so as to allow storing data in a customised format. A tag user can define a data format and a format name, at least the latter being stored in the tag. The format name is detected by a tag interrogator and used to retrieve the specific format descriptor, which can be a remote file, stored on a floppy disk or in a processor or accessible via the Web. The format descriptor is then used to parse and interpret the information stored in the tag itself. In case the tag is used by different users, each of them can define a specific data format on a respective tag portion. This invention specifies also the possibility to protect some parts of the data stored in the tag using a data integrity check (i.e. CRC).

A limitation of this method is that it is only intended to allow customised data formatting by different users and to ensure data integrity using a CRC method.

US-A 2003/0006578 and U.S. Pat. No. 5,469,363 disclose techniques more sophisticated than using a CRC for preventing or discovering data tampering on smart tags, including electronic tags.

In particular US-A 2003/0006578 discloses a method for encoding data stored in a smart tag including a memory having a permanent number stored in a first portion thereof that cannot be changed, and having a second portion in which information can be stored. Application specific information is stored in the second portion of the smart tag memory, together with a relational check number representative of one of (a) the application specific information and (b) the application specific information and the permanent number.

U.S. Pat. No. 5,469,363 discloses an inventory control system using an electronic tag that keeps an unalterable log of each step in the handling of a controlled item. As a countermeasure against sophisticated theft attempts involving communicating with the smart tag to defeat the security system by learning the password and thereafter altering identification records, the tag permits only a limited number of attempts to read out the secret identification number.

In case of a multi-user, multi-service tag more than one party can be involved in the data management on the e-tag. Considering the preferred application in a wireless scenario, besides the end users, also the wireless network operator and/or the service operator (if different from the network operator) together with one or more commercial users or customers (the providers of the individual information services offered on the tag) need to access the data. Some data might be relevant only for one of the parties and be proprietary data, requiring specific security measures for access control and data communication. For example, a network/service operator who wants to deliver a multiplicity of RFID-based services to different user categories will have to share the data storage area of a tag with its commercial customers. For doing that, the operator should have the possibility to rely on proprietary data fields on the tag, with a common data format to manage different customers and services. In the same way, the commercial users (shops, restaurants, public administrations . . . ) need to have their own data fields for delivering information services to the end user and for storing their management information. The management information is proprietary and in some cases it has to remain confidential, thus requiring security measures, both on the network/service operator side and on the end user side. In fact, some information stored on the tag can be useful only for the commercial user who wants that neither the end user nor the network operator can access it.

Thus, the need arises for controlling the access to an electronic tag by different categories of users in order each of said categories or each of said users is allowed to access only the contents of certain tag portions. In this way, not only the data integrity, but also the data confidentiality, are assured.

SUMMARY OF THE INVENTION

According to the invention, a method of secure management of data records stored in an multi-service, multi-user electronic tag is provided, wherein said data records comprise data fields whose contents are provided by different parties and wherein some data fields contain information data relevant to one or more services accessible to authorised end users. The method comprises the steps of:

storing at least part of said data fields in encrypted form, by encrypting data provided by different parties with different keys, each key being personal to the party providing the data for the respective field; and delivering different sets of keys to said end users and said different parties, so as to set different access rights for said end users and said different parties, the different sets of keys being such that said end users are provided with the keys allowing access to the information data and each of said different parties can keep exclusive access right to specific data provided by the party itself.

The invention also concerns a system for the secure management of data records stored in an multi-service, multi-user electronic tag, comprising:

a plurality of electronic tags, arranged to store respective data records where at least part of the data fields are in encrypted form, data provided by different parties being encrypted with different keys, each key being personal to the party providing the data;

a plurality of authorised user equipments arranged at least to read the electronic tags; and at least one RFID-based service provider node and at least one information data provider node, which are said data providing parties and which are arranged to provide the end users and the other parties with different sets of keys so as to set different access rights for said end users and said parties, wherein each user equipment is arranged to store keys allowing access to the information data fields and each party can have exclusive access to specific data provided by the party itself.

The invention also provides an electronic tag storing data records managed by the method and the system. According to the invention, at least part of the fields of said data records are stored in encrypted form, by encrypting data provided by different parties with different keys, so as to set different access rights for said different parties and said end users, such that the end users are provided with the keys necessary for access to the information data, and any proprietary data is encrypted with a key available only to the data owner.

BRIEF DESCRIPTION OF THE DRAWINGS

A preferred embodiment of the invention, given by way of non-limiting example, will now be disclosed with reference to the accompanying drawings, in which.

DESCRIPTION OF THE PREFERRED EMBODIMENT

The invention will be described in detail with reference to the preferred application to the provision of RFID-based services, in particular information services, within a wireless network scenario.

Use of the RFID technique in a wireless network scenario is of particular interest for providing information services to the network users: the e-tag reader or interrogator could be incorporated in the user mobile equipment, like a cellular phone or a personal digital assistant (PDA), thereby dispensing the RFID service users from carrying an ad hoc terminal with them. Combination of the RFID and wireless techniques may be effected so that the selection of a service of interest and the attainment of a basic level of information could be performed without setting up a call through the wireless network, and more detailed information about an item of interest could then be downloaded through the network.

In the most general case, the e-tags are multi-user and multi-service tags, that is a same tag can be used for different services (e.g. tourist information, commercial information, public transport information, etc.) offered by different providers, and access to the information content is allowed to authorised end users, for instance all people having subscribed the service. For optimising tag exploitation, each tag is assumed to contain, in the information fields, only the essential information necessary for identifying the objects or items (monuments, restaurants, cinemas, public transport lines . . . ). The identification of the object or item allows then downloading specific contents related to the object from a database of a content provider, which is accessed through the wireless communication network, as said before.

Figure 1:
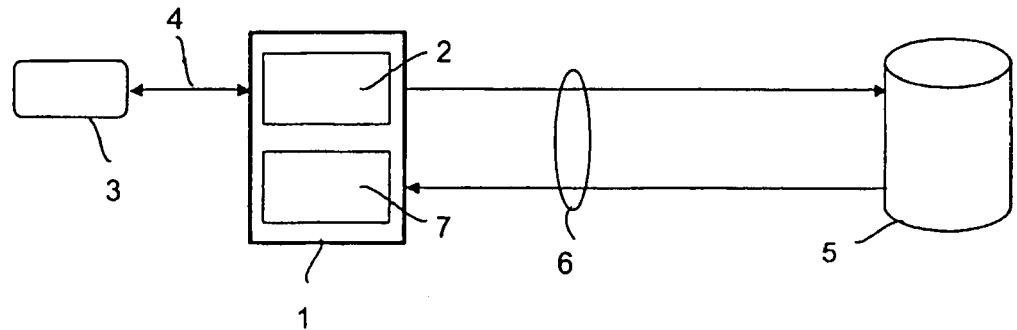
FIG. 1 is a schematic representation of a system employing the RFID technique in a wireless scenario, in which the invention can be applied.

Referring to FIG. 1, in the above scenario, a mobile device 1 (mobile telephone, PDA . . . ) incorporates an interrogator 2 (a tag reader or a tag reader/writer if the user is authorised also to write into the tag memory), so that it can interact with an e-tag 3 through a first RF link 4, which does not involve the wireless communication network. In general, a plurality of e-tags could be located in the radio operation range of RFID interrogator 2, and the latter is arranged to scan all tags in that range in order the user can select a service. Through the usual communication functions, mobile equipment 1 also allows the user to access a remote server 5 through the wireless network, as indicated by link 6, to get more detailed information about a selected item. The connection with remote server can be a GSM/GPRS/UMTS connection in outdoor environments or a Wi-Fi connection in indoor environments.

Mobile device 1 can receive from server 5 a text regarding the object plus several links to other contents related to the main content. The solution allows navigation through the information related to the object. The text could be associated with images and interactive maps.

Besides RFID interrogator 2, a Text-To-Speech module 7 can be integrated into mobile device 1, to increment the information service usability: this way, it is possible not only to show the contents as text and images on the display of the device itself, but also to convert the text in voice. Also a conversion into images can be provided for.

In the case of multi-service, multi-user tags concerned by the preferred application of the invention, different entities are interested in the information stored in a tag 3, namely:

the RFID-based service operator, which for sake of simplicity is assumed to coincide with the wireless network operator;

the "commercial users", i.e. the entities that supply and own the information provided within the different services available on a tag, e.g. public transport enterprises, restaurant or shop owners, public administrations, etc.;

the end users.

To avoid any confusion between the entities that manage the RFID services and the entities that provide the information for the individual service, the former will be referred to as "service operators" or "service operator nodes" and the latter as "information providers" or "information data provider nodes".

Figure 2:
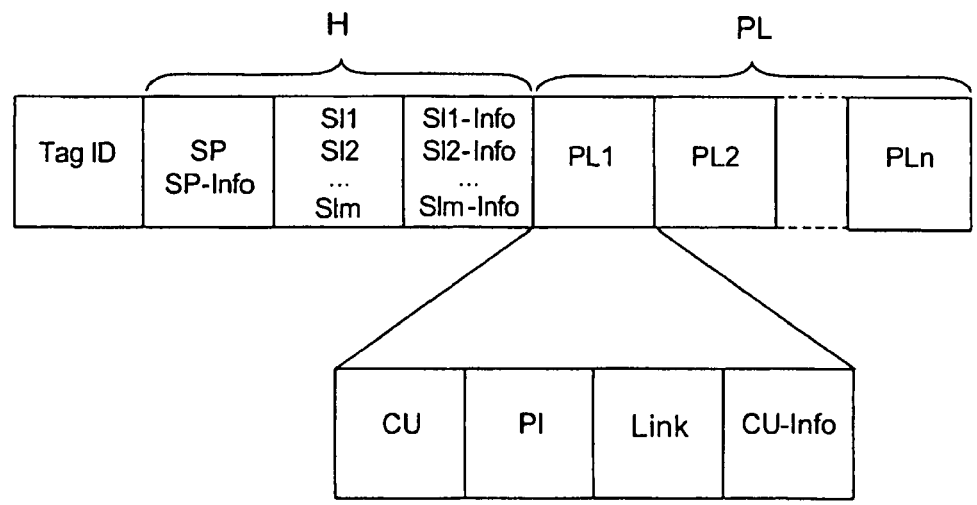
FIG. 2 is a diagram showing an exemplary data organisation on an electronic tag used in the invention.

The organisation of the data in tag 3 must be such as to maintain flexibility and to allow addition of user specific fields with custom data format(s). A possible organisation could be as shown in FIG. 2. Besides an identification code (Tag ID) that uniquely identifies the tag, the data record comprises a tag header H and a tag payload PL.

Header H will be generally managed by the service operator (i.e. the network operator, in the example considered) and it might comprise the following fields:

RFID-based service operator identity (SP) and operator information (SP-Info);

Service Identifier (SI);

Service information (SI-info).

Field SP is useful if we think to have a tag supporting different RFID-based services provided by various operators. Field SP-Info could be a field in which the operator can store its own generic and management information; it could instead contain useful information, such as longitude/latitude and temperature logging for localisation and public usage services. In the drawing, the SP and SP-Info fields have been shown as a single field. Field SI allows filtering and making a pre-selection among all detected tags, based on a specific service requested by the user. This avoids giving the user non-requested information. Field SI-info contains the service name and the position of the corresponding fields in the tag payload. Of course, the header could also contain further fields for proprietary data of the operator(s).

When more than one service is provided with the same tag, header H will contain more than one field SI and, consequently, more than one SI-info field, as indicated by SI1, SI2 ... SIm and SI1-Info, SI2-Info ... SIm-Info in the Figure. This applies also to fields SP, SP-Info. In the Figure, a single operator has however been assumed.

The tag payload contains all fields related to the commercial users of tags 3 and the information data to be provided to the end users. The payload can be seen as subdivided in several sections PL1, PL2 ... PLn, e.g. as many as are the services available on a tag 3 and/or the information providers for such services. The following fields might be envisaged in each section:
  Commercial User identifier (CU);
  Public Information data (PI);
  Reference to the remote content (Link);
  Commercial User Information (CU-Info).

Field CU is used when there is more than one commercial party providing the same service. Field PI contains the information to be made available to the end users. For example, it can store a brief note on what a tagged object is or a very short summary of the actual information content, which is typically on a remote server, as said before. Field "Link" contains a code (generally tightly related to tag ID) used to index the remote content: for example, it may consist on a Web link to a file, downloadable on request of the end user and containing the detailed information on the tagged object. Field CU-Info could store all proprietary information of a commercial user, useful for statistics, service and object monitoring or management. Further fields can be added, if necessary.

The formats of specific fields (e.g. "Info" fields) or of all fields are open to a customisation by the pertinent user or owner of that portion of tag, for instance according to the mechanisms taught in U.S. Pat. No. 6,480,100. More generally, the SP could decide the entire tag header format and the CU(s) could decide the data format for the tag payload (or the respective payload section).

One of the major concerns in use of multi-user, multi-service tags is security. On the one side, the data integrity is to be ensured, and this can be made with any of the mechanism known in the art. On the other hand, the information should be protected in order to avoid tag usage by unauthorised people and to guarantee the confidentiality of proprietary and sensible data, which should be accessible only to the owner. Authentication and/or encryption mechanisms should be adopted to solve this problem. The security level and the strength of these mechanisms are strictly dependent on the specific application.

The minimum security level is having different access privileges for the different record fields. Generally, data access rights may be:
  read access only to user-pertinent information, e.g. only the CU can read data contained in the CU-Info field;
  write access only to field's owner, e.g. only the SP can write and modify the Service ID field.

To enforce security, the data stored in different fields of an e-tag are encrypted using different keys, depending on the field's owner. Moreover, a secure mechanism is provided in order to make the keys available to the parties, other than the owner, which are enabled to read the contents of the encrypted fields.

In the exemplary solution described here, the following different encryption keys are used:
  $K_{SP}$: Service Operator Key, owned by the RFID-based service operator and used to encrypt the tag header;
  $K_{SI}$: Service Key, owned by the commercial user offering a specific service and possibly by the service operator, and used to encrypt the CU and PI fields; if several services are provided on a tag, one key $K_{SI}$ for each service will be used;
  $K_{CU}$: Commercial User Key, owned by the commercial user and used to encrypt the Link and CU-Info fields; if a tag stores information provided by several CUs, one key $K_{CU}$ for each commercial user will be used For exploiting the RFID services, the end user has to be provided with service operator key $K_{SP}$ (or with keys $K_{SP}$ of all service operators with which he/she is registered) and with the set of keys $K_{SI}$ related to the services enabled for him/her. The keys will be provided to the user by a service provider node (network operator), when a service is activated. The keys will be sent to the user by exploiting the security mechanisms provided by the wireless network and will be stored on the SIM card (or another authentication module) in mobile terminal 1.

Figure 3:
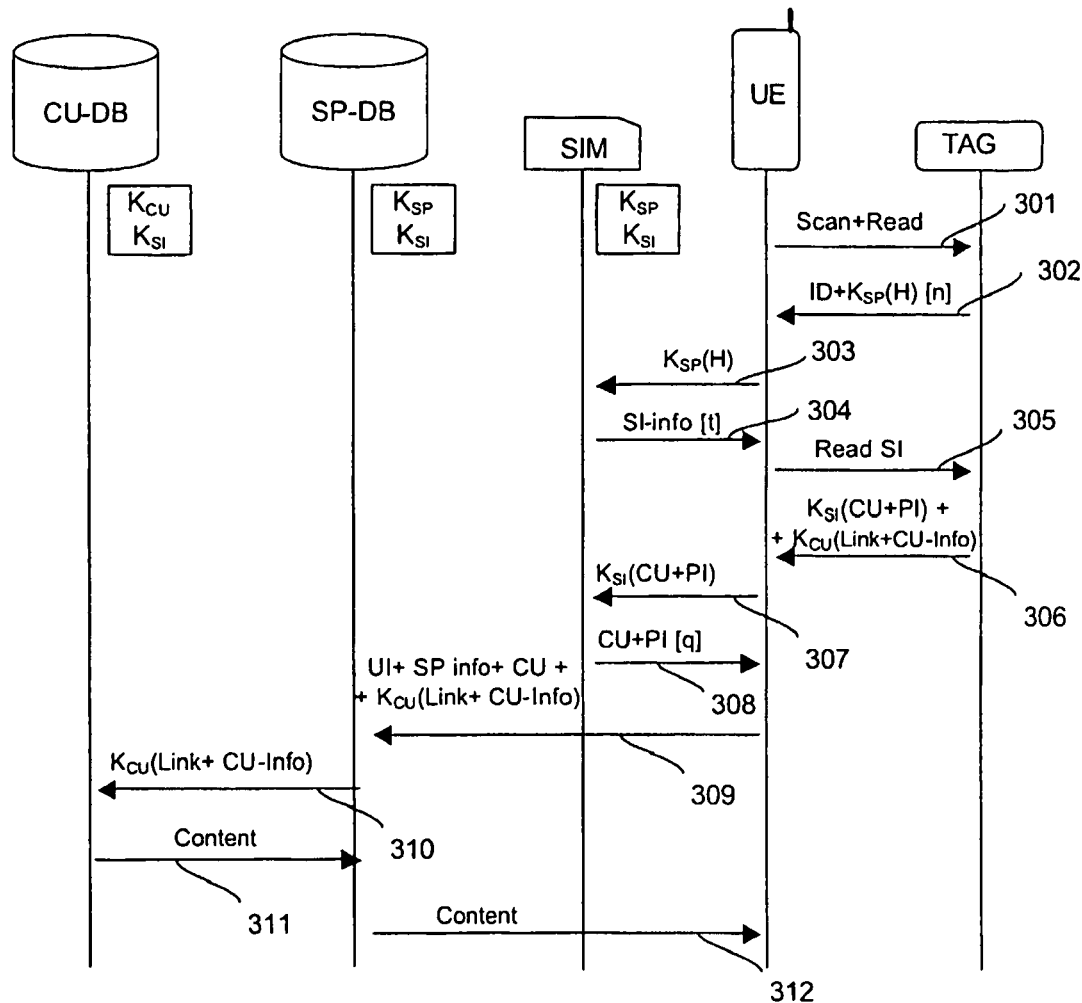
FIG. 3 is a signalling diagram showing the interactions between the different parties having access to the tag during reading of information data.

In FIG. 3, a complete data flow of the access to the information for reading is presented. UE denotes the user mobile equipment, which is shown separately from the SIM card for sake of clarity. The SIM card contains key $K_{SP}$ and key(s) $K_{SI}$. Said keys had been previously loaded into the card with a procedure disclosed below. UE and SIM together form user terminal 1 of FIG. 1.

SP-DB indicates the data centre (service provider node) and the whole of the management units of the RFID-based service operator SP, storing operator key $K_{SP}$ and keys $K_{SI}$ of all services offered on the tags of that operator. CU-DB generally indicates the data centre(s) (data provider node), and the whole of the management units of one or more commercial users or information providers. The parenthetical indications of one or more field names after a key name means that the contents of such field(s) are encrypted with said key. The following symbols are also used in the drawing:
  n: number of detected tags;
  t: number of user enabled services;
  q: number of CUs providing a service;
  UI: User Identification code The operations occur in succession from top to bottom in the drawing.

As a first step, e-tag interrogator 2 in a user terminal 1 scans (step 301) all tags present in its radio range. As a result of the scanning operation, UE reads identification codes IDs and headers H of the detected tags (step 302) and forwards the headers (encrypted with $K_{SP}$) to SIM for decryption (step 303). Upon having decrypted the headers, SIM supplies the user (step 304) with the indications SI-Info (t) about services the user can access (i.e. the services the user has paid for), which are displayed on UE. The returned data structures describe the tags to be read and the bytes to be retrieved, so that when UE requests access to a service, the tag reader can properly address the tag memory.

The user chooses the service of interest by UE and reads the corresponding SI bytes by e-tag interrogator 2 (step 305). In this manner UE can download (step 306) fields CU and PI, which are encrypted with $K_{SI}$ and fields Link and CU-Info, which are encrypted with $K_{CU}$. The contents of fields CU and PI are sent to SIM for decryption (step 307), and the decrypted field contents are sent to UE (step 308) so that UE can actually display information data of interest for the user. The contents of fields Link and CU-Info serve to the concerned commercial user(s) for processing the information request and for management purposes. Since such fields are encrypted with a key available neither to the user nor to the RFID service operator, confidentiality is ensured. Note that, if also the header contains information that are not to be made accessible to the end users, the relevant fields shall be encrypted by a further operator's key different from $K_{SP}$, so that the end users cannot decrypt such data; like key $K_{SP}$, such a further key is not available to the commercial users either.

Based on the information contained in PI and displayed on UE, the user sends a request for the actual information content to the service operator (step 309), said request comprising:
a) user identifier UI;
b) service operator information SP-Info;
c) commercial user identifier CU;
d) the link and the private data of the commercial user CU-Info, still in encrypted form.

The operator receives the request, processes SP-Info and forwards the request to the commercial user corresponding to identifier CU (step 310). The commercial user gets the request, decrypts CU-Info field and Link, retrieves from database CU-DB the content related to the particular request and sends such content to UE through the network (steps 311, 312). The content can be presented through an information browser or through naturalisation interfaces like text-to-speech converter 7 (FIG. 1). At the same time, the commercial user can take any action on CU-Info.

Hereinbefore it has been implicitly assumed that all tags have the same known field format disclosed in FIG. 2. A quite similar mechanism can be adopted if different formats are used e.g. for the tag header (decided by the RFID-based service operator) and for the tag payload sections (decided by the CUs). Assuming that the data formats are defined by using a method as taught by U.S. Pat. No. 6,480,100 mentioned above, the "format name" used to retrieve the selected data format and to interpret and parse the tag data could be determined by code SP itself for the tag header and by code CU for a tag payload section. The format description could be locally stored on the user equipment itself (e.g. in the SIM) or downloaded from a remote server.

Figure 4:
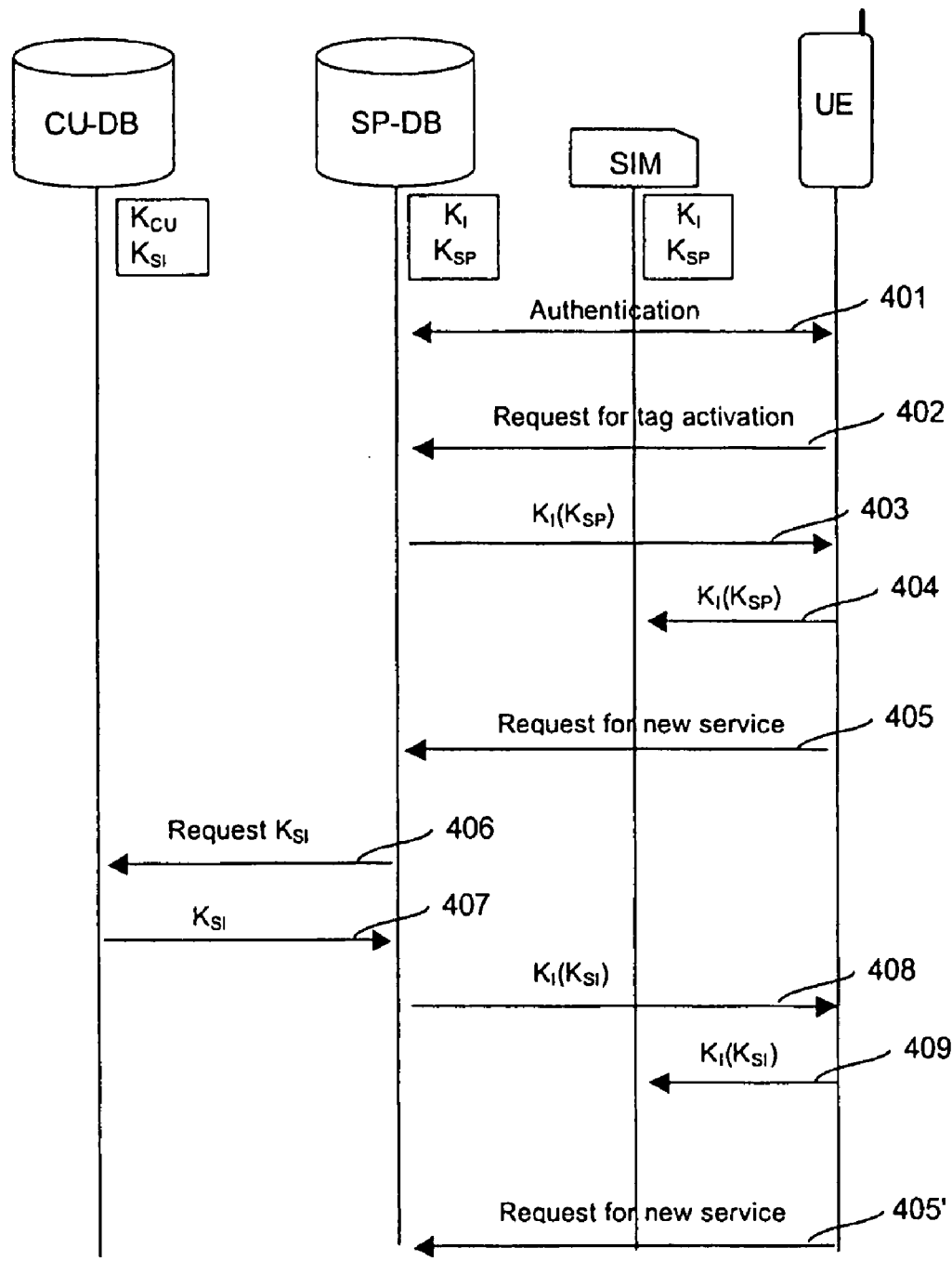
FIG. 4 is a signalling diagram showing the interactions between the different parties for supplying the users with the encryption keys.

As stated before, the SIM of mobile equipment 1 needs to store the service operator key $K_{SP}$ and one or more service keys $K_{SI}$. A secure mechanism for transferring such keys from the owner (the RFID-based service operator, or the service operator and the commercial user(s)) to the SIM has to be envisaged. In the disclosed embodiment, in which the service operator is the wireless network operator, an advantageous solution could be exploiting the security mechanism of the conventional SIMs, based on the so-called primary key (or individual subscriber authentication key) $K_I$. This solution is shown in FIG. 4.

When a user wishes to subscribe to the RFID-based service, he/she contacts the service operator and, after authentication, as in any mobile communication (step 401), the user sends a request (request for tag activation) to the operator (step 402). The operator replies by sending key $K_{SP}$ encrypted with primary key $K_I$ to UE for decryption by SIM and storage therein (steps 403, 404). Key $K_{SP}$ is transferred just once, at the activation of the RFID service for a user.

Then, the user selects one or more services of interest to be activated on his/her UE and sends the relevant request(s) to service operator SP (step 405), which consequently requests key(s) $K_{SI}$ to the concerned commercial user(s) (step 406). Upon reception of that key or those keys from the commercial user(s) (step 407), the SP forwards it (them) to UE, again after encryption with $K_I$ (steps 408, 409). As before, the key(s) is (are) stored in the SIM.

Steps 405 to 409 will be performed for each service requested and will be repeated whenever the access to a new service is desired. The drawing only shows a repetition of the service request (step 405').

Figure 5:
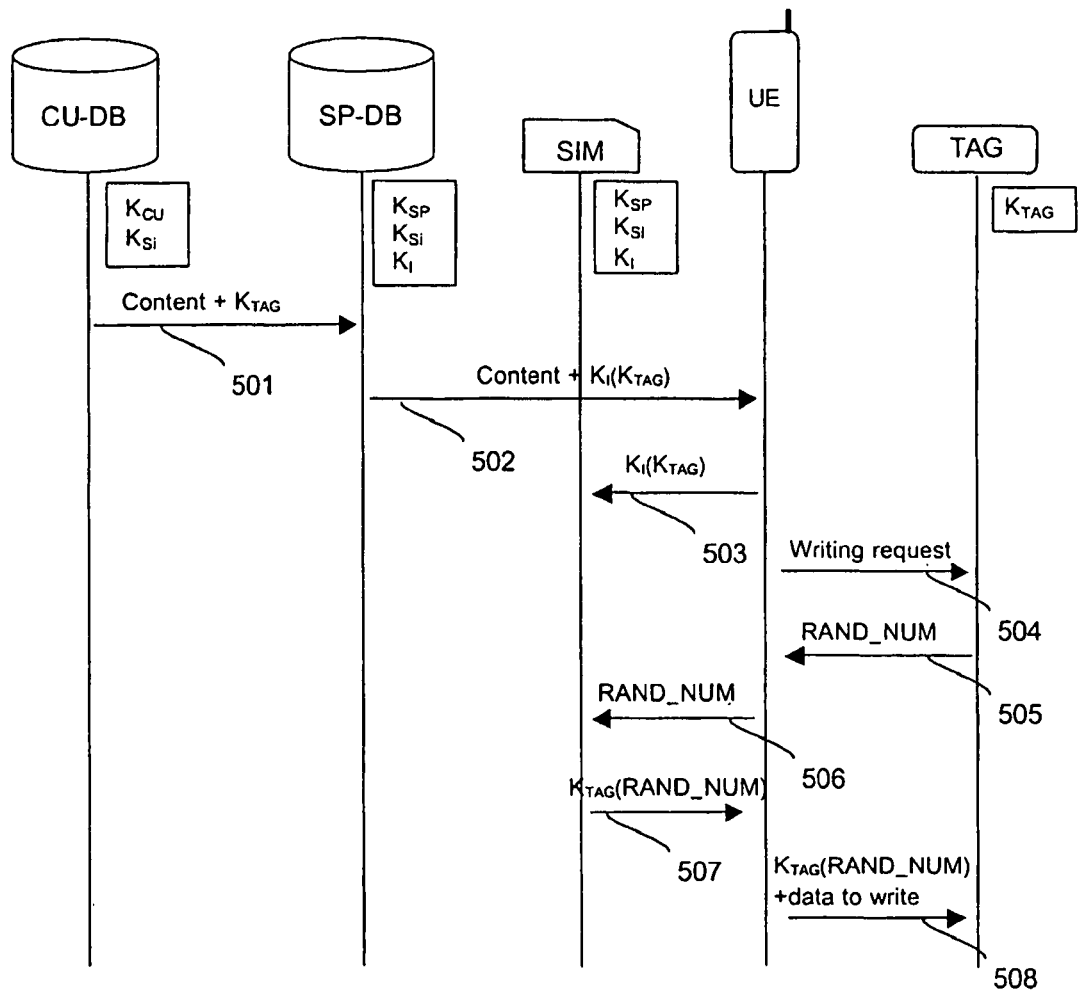
FIG. 5 is a signalling diagram showing the interactions between the different parties for writing data into the tag.

A similar security mechanism can be used in applications where the user is allowed to write information on the tags. In such case, the tag is to be equipped with an additional authentication module storing a key $K_{TAG}$ typical of the tag and serving for authentication of the user. The writing procedure is shown in FIG. 5, where it is assumed that the user has to write data provided by a commercial user CU.

After the reading procedures, disclosed in FIG. 3, the CU transmits $K_{TAG}$ along with the content to SP (step 501). SP encrypts $K_{TAG}$ through $K_I$ and sends it to user equipment UE for storage in the SIM (steps 502, 503).

The user then sends a writing request to the tag (step 504). In response to the request, the tag sends a security code or challenge (RAND_NUM), consisting e.g. of a random number, to the user (step 505), and this code is temporarily stored in the SIM (step 506). The SIM answers by encrypting RAND_NUM with $K_{TAG}$ (step 507) and the terminal associates the data to be written to the encrypted random number and sends the whole to the tag (step 508). The tag decrypts the response to the challenge and, if the transmitted and received challenge match, allows the writing operation.

Of course, instead of automatically starting the writing at the end of the reading phase, as disclosed in the drawing, CU could provide key $K_{TAG}$ upon a request of the user, in similar manner to what disclosed with reference to FIG. 4 for the request for new service. Key $K_{TAG}$ could also be supplied to the users together with the other keys.

Generally, a writing operation can concern any field on the tag, and the data to be written will be encrypted with the same key(s) as used for encrypting other data in the destination field(s). Moreover, different users could be enabled to write on different fields.

For instance, a user who writes data on behalf of a CU, as shown in FIG. 5, will generally have access only to fields PLi (i=1, 2 . . . ) of that CU and will write data into fields CU and PI by using key $K_{SI}$ and into fields CU-Info and Link by using key $K_{CU}$. A user who writes data on behalf of SP will have access to header H and will write data encrypted with key $K_{SP}$ (or any other operator key). A user authorised to write his/her own data will have access e.g. only to field PI and will write the data by using key $K_{SI}$.

In all above scenarios it is supposed that the communication between SP and CU is done through a secure channel (e.g. a trusted wireless SP network).

Thus, the present invention provides a secure management of the data stored on an electronic tag, obviating the drawbacks and limits of the prior art. The contents of the tag memory are differently encrypted by the different owners, and only the users having subscribed to RFID services are provided with the keys allowing them to read the information data, and this only for the specific services they have chosen. Proprietary data of any of the parties involved in the service are encrypted with keys that are available only to the data owner. Security has been taken into account also when providing the users with the keys.

It is clear that the above description has been given only by way of non-limiting example and the changes and modifications are possible without departing from the scope of the invention.

In particular, even if the invention has been disclosed with particular reference to an application of the RFID technique in the wireless scenario, the multiple key mechanism can be adopted also outside the wireless scenario. In such case, the user will receive the keys in any suitable manner from the RFID service operator(s) or the commercial users, and the keys will be advantageously stored in a trusted card of the user's terminal.

Moreover, even if it is assumed that all data fields are encrypted, some fields, e.g. advertising or public utility fields, could be left unencrypted. Of course, also writing by the end users in such fields will take place in clear.

Furthermore, different data organisations can be envisaged and any number of keys can be used. In general, it can be said that the end users only are provided with the keys necessary for access to the information data, and any proprietary data is encrypted with a key available only to the data owner.

The invention claimed is:

1. A method of secure management of data records stored in an RFID tag, wherein said data records contain a header portion and a payload portion and comprise data fields whose contents are provided by different parties, the different parties including an RFID-based service operator and at least one information data provider, wherein the data fields comprise service data fields and proprietary fields, wherein the service data fields contain information data relevant to at least one RFID-based service and are accessible to authorized end users, and wherein the proprietary fields contain proprietary data provided by the different parties, the method performed by the RFID-based service operator comprising:

causing a first set of the service data fields to be stored in the RFID tag, the first set being managed by the RFID-based service operator and being encrypted with a first key personal to the service operator, the first set including the header portion of the data records;

causing a second set of the service data fields to be stored in the RFID tag, the second set being managed by the at least one information data provider and being encrypted with a second key specific to a service of the at least one information data provider;

determining a registration by said end users for access to the at least one RFID-based service; and delivering sets of keys to user equipment of said end users separate from the RFID tag so as to set different access rights to the data fields on the RFID tag for said end users and said different parties, the sets of keys each including the first key personal to the service operator such that said end users are provided access to the information data in the first set of the service data fields on the RFID tag, the sets of keys for end users registered to access the at least one RFID-based service including the second key specific to the service of the at least one information data provider such that said registered end users are provided access to the information data in the second set of the service data fields, each of said different parties having additional keys different from the sets of keys for said end users and allowing an exclusive access right to the proprietary data stored in the proprietary fields on the RFID tag and provided by the party itself.

2. The method as claimed in claim 1, wherein said causing a second set of the service data fields to be stored comprises including in each data record a plurality of payload sections including said second set of service data fields along with information data fields managed by the information data provider and encrypted with the second key.

3. The method as claimed in claim 2, wherein said information data fields contain a short indication of remotely stored data contents available in a data base of an information data provider, and the payload section contains information allowing access and download of said remotely stored data through a wireless network, said information being encrypted with a key specific to the information data provider.

4. The method as claimed in claim 1, wherein said causing a first set of the service data fields to be stored and causing a second set of the service data fields to be stored further comprises storing the header portion and the payload portion of the data records in different formats, and including in said first and second sets of service data fields, information identifying the respective format and allowing the end users to access a format definition for data read from the tag.

5. The method as claimed in claim 1, further comprising:
storing in the RFID tag a writing key specific to the tag;
determining authorization of said end users to write data into the RFID tag; and
delivering the writing key to said authorized end users.

6. The method as claimed in claim 1, wherein said delivering keys to the end users comprises storing in the user equipment, a first key for each RFID-based service operator a respective user is registered with, a second key for each service accessible by the respective user, and a writing key for each RFID tag into which the respective user is authorized to write data.

7. The method as claimed in claim 6, wherein said keys are provided to the respective end user in encrypted form by encrypting them with an authentication key specific to the respective user.

8. The method as claimed in claim 6, wherein said delivering sets of keys to said end users comprises delivering by using an individual subscriber authentication key and causing said keys to be stored in an authentication module of the wireless equipment.

9. The method as claimed in claim 1, wherein said end users are users of a wireless communication network and are equipped with wireless communication equipment including electronic tag reading or reading/writing capability, and said RFID-service operator is the wireless network operator 10. A system for secure management of data records stored in RFID tags, comprising:
at least one RFID-based service operator;
at least one information data provider;
a plurality of electronic RFID tags arranged to store respective data records, wherein said data records contain a header portion and a payload portion and comprise data fields whose contents are provided by different parties, the different parties including the RFID-based service operator and the at least one information data provider, the data fields comprising service data fields and proprietary fields, wherein the service data fields contain information data relevant to at least one RFID-based service and are accessible to authorized end users, wherein the proprietary fields contain proprietary data provided by the different parties, a first set of the service data fields being managed by the RFID-based service operator and being encrypted with a first key personal to the service operator, the first set including the header portion of the data records, a second set of the service data fields being managed by the at least one information data provider and being encrypted with a second key specific to a service of the at least one information data provider;

a plurality of authorized end user equipment separate from the RFID tag and arranged at least to read the electronic RFID tags, each of the plurality of end user equipment having a set of keys including the first key personal to the RFID-based service operator such that said end users are provided access to the information data in the first set of the service data fields on the RFID tag, the set of keys for end users registered to access the at least one RFID-based service including the second key specific to the service of the at least one information data provider such that said registered end users are provided access to the information data in the second set of the service data fields; and wherein the at least one RFID-based service provider and the at least one information data provider respectively have at least one key allowing exclusive access to the proprietary data stored in the proprietary fields on the RFID tag and provided by the party itself.

11. The system as claimed in claim 10, wherein information data can be accessed and each end user is arranged to:
scan all tags present in a radio range of said user equipment by a tag interrogator incorporated in said equipment;
read from the scanned tags and decrypt in said equipment the contents of service data fields present in said data records, in order to identify a service of interest and information data of interest provided by said service; and
read and decrypt the information data.

12. The system as claimed in claim 10, wherein said at least one RFID-based service operator is arranged to include said first set of service data fields in a header section of each data record, and said at least one information data provider is arranged to include said at least one second set of service data fields in a corresponding at least one payload section along with information data fields relevant to a specific service.

13. The system as claimed in claim 12, wherein said at least one RFID-based service operator and said at least one information data provider are arranged to provide the header portion and the payload portion of the data records in different formats, and to include in said first and second sets of service data fields, information identifying the respective format and allowing the end users to access a format definition for parsing information data read from the tag.

14. The system as claimed in claim 10, wherein the user equipment of at least some of said authorized end users incorporates an electronic tag writer.

15. The system as claimed in claim 14, wherein, for writing data in an electronic tag, end users enabled to writing are arranged to:

receive a writing key typical of said tag;
send a writing request to said tag;
receive a security code from said tag in response to the request;
encrypt said security code with said writing key and send the encrypted code together with the data to be written to said tag; and
wherein said tag is arranged to receive and decrypt the encrypted code to compare the decrypted code with the code transmitted to the user and to enable data writing if the comparison gives a positive outcome.

16. The system as claimed in claim 15, wherein for writing data in said at least part of the data fields, said users enabled to write are arranged to send to said tag data encrypted with a same key as that used for encrypting data stored in the destination field or fields.

17. The system as claimed in claim 10, wherein said user equipment is arranged to store a first key for each RFID-based service operator with which a user is registered, a second key for each service accessible by the user, and a writing key for each tag into which a user is authorized to write data.

18. The system as claimed in claim 17, wherein the key owners are arranged to deliver said keys to each end user in encrypted form by encrypting them with an authentication key typical of the user.

19. The system as claimed in claim 18, wherein said keys are stored in an authentication module of the wireless equipment and are supplied by the network operator after encryption with said authentication key.

20. The system as claimed in claim 18, wherein said information data contain a short indication of remotely stored data contents available in a data base of an information provider, and an e-tag interrogator is arranged to read from the payload section, information allowing the user equipment to access and to download through the wireless network, said remotely stored data contents.

21. The system as claimed in claim 10, wherein said end users are users of a wireless communication network and are equipped with wireless communication equipment incorporating an electronic tag reader or reader/writer, and said RFID-service operator is a wireless network operator.

22. The system as claimed in claim 10, wherein said user equipment comprises a text-to-speech converter for converting text included in the information data into speech.

23. The system as claimed in claim 10, wherein said user equipment comprise a conversion unit arranged to convert part of the information data into image form.

* * * * *